Sept. 12, 1967   R. J. LASHER   3,340,733
DESIGN FOR A STRAIN GAUGE TARGET FLOW METER
Filed Sept. 28, 1964

Richard James Lasher   INVENTOR

BY *Llewellyn A. Proctor*

PATENT ATTORNEY

United States Patent Office 3,340,733
Patented Sept. 12, 1967

3,340,733
DESIGN FOR A STRAIN GAUGE TARGET
FLOW METER
Richard James Lasher, Baton Rouge, La., assignor to Esso Research and Engineering Company, a corporation of Delaware
Filed Sept. 28, 1964, Ser. No. 399,746
3 Claims. (Cl. 73—228)

ABSTRACT OF THE DISCLOSURE

The invention contemplates a device of simple construction for measuring the movement of gases through conduits at very low flow velocities ranging no more than from about 0.1 to about 4.0 feet per second. The device calls for a combination which includes a semi-rigid cantilever arm having a free end with a target mounted thereon for extension into the conduit, and a fixed end portion in parallel contact with a semi-conductor gauge having an electrical resistivity at room temperature ranging from about $10^{-2}$ to about $10^{-9}$ ohm-cm. Mechanical strains are produced upon movement of the free end of the cantilever by impinging gases, and these strains are converted into electrical signals of intensity proportional to the strain.

---

Figure 1:
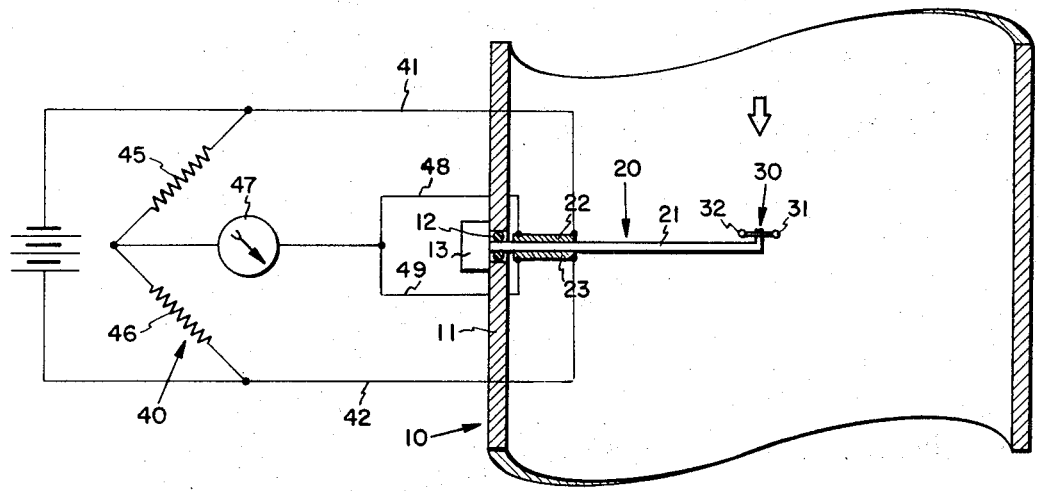

This invention relates to apparatus for measuring the velocity of flow of fluids. In particular, it relates to an extremely sensitive flow meter device for measuring the rate of flow of gases passing through conduits at extremely low velocities.

Devices for measuring fluid flow are well known to the art. A major disadvantage of the majority of such devices, however, is that the flow of fluids through the area wherein the measurement is taken is greatly restricted by the measuring devices. Thus, e.g., the primary sensing element of such device consists generally of a relatively large body which must be placed within the conduit so that the force of the moving fluid can be exerted thereupon. Many such instruments depend, e.g., upon the measurement of a differential pressure taken at locations upstream and downstream of the restriction. Thus, orifice plates or venturi sections are common primary sensing elements of such character and depend for their very operation upon restricting a portion of the flow through the conduit.

Instruments for measurement of the flow velocity of gases are also known, though the rate of flow of gases is more difficult to measure, especially at low velocities because, inter alia, of the lesser specific gravity of gases. Devices for measuring gas flow rate are also often operative on the principle of forming a drag or the measuring of differential pressure. Such devices, however, leave much to be desired in the measurement of the flow rate of gases, particularly where the flow is at extremely low velocities. For one thing, since gas is far less dense than liquid, and exerts less drag, the primary sensing elements often provided greater problems in that the restricting surface within a conduit must be relatively larger for detecting a given gas flow rate as contrasted with a similar device for measuring the flow rate of a liquid.

An acute problem is that involved in accurately measuring the flow rate of gases in a conduit—e.g., in a flare stack—wherein gases normally move at very low velocity and the rate of flow is generally highly variable. Thus the rate of flow of a gas is often only a few tenths of a foot per second, and sometimes even less. At other times the rate of flow rises to several feet per second, and then may diminish quite suddenly. Occasionally a blow-off occurs wherein the rate of flow rises to such proportions that sensitive measuring devices can be damaged. Such varying conditions can provide quite hazardous circumstances where such devices are employed, the primary sensing elements of which are too greatly restrictive. The problems of precise measurement are even more difficult when the gas phase carries an entrained liquid or conditions are such that condensation of liquid occurs upon the sensing element of the measuring device.

Strain gauges have been occasionally used in various capacities in devices for measuring the rate of flow of fluids, even for measuring the flow rate of gases. In such devices there is usually provided a relatively large sensing element, i.e., a plate, bulb, or vane, fitted into a conduit and acting in concert with a wire capable of mechanical deformation therein to produce therein a measurable change in electrical resistance. The element greatly restricts a gas conduit, however, since it must be relatively large in relation to the conduit so that the force exerted by the flowing gas upon the element provides sufficient mechanical strain to change the electrical resistance of the wire so that the change in resistance can be measured.

Such strain gauges, however, leave much to be desired in the measurement of gases flowing at extremely low velocity, especially where the system is subject to sudden and varying changes in rate of flow. For this reason, inter alia, devices called anemotherms are more widely used for such measurements. These devices generally consist of a probe which houses a pair of primary sensing elements, each constituting resistances across a Wheatstone bridge circuit. Heat is produced near one of the elements by an electrical heater supplied with a constant flow of electricity. The temperature produced in the heated probe reaches a maximum and remains constant and higher than the unheated element in a static system, as when the probe is placed in a conduit where no gas is flowing. When gas flows, however, the heat from the heated element is caused to be dissipated and a lower differential temperature exists between the two elements. The differential temperature between the two sensing elements is readily determined at any given moment and it bears a distinct relationship to gas flow rate.

Anemotherms have proven quite sensitive, very attractive, and quite useful in certain environments but have left much to be desired especially where mixed phase flow or a fouling gas is encountered. In such circumstances the devices have proven unreliable. Thus, where, e.g., a gas stream carries liquid droplets, or where the latter are caused to accumulate in any manner upon a resistance element, an erroneous reading is generally imparted. Moreover, the presence of fouling liquids often results in the deposition of foreign matter upon the sensing elements of the anemotherms which must then be cleaned before capable of further use.

A need, therefore, exists in the art for a more reliable device, of simple construction, for measuring the velocity of flow of gases, especially at very low rates of flow and under constantly changing velocities and conditions.

It is accordingly the primary objective of the present invention to fulfill this need and to supply the art with a new and improved apparatus. In particular, it is an objective to provide such device of extreme sensitivity and capable of measuring the rate of flow of gases at extremely low velocities as well as for detecting sudden changes in the rate of flow. More particularly, it is an object to provide such device which offers no significant obstruction to the flow of the gases which it measures, and which is only momentarily affected, if at all, by mixed phase flow. Further, the device presents no pluggage problems, and creates no hazards as could result in certain environments. It is a further object to supply a readily transportable apparatus, a portion of which is in the form of a probe assembly, which can be readily inserted into a conduit, e.g., a flare stack, and easily removed as occasion demands.

These and other objects are achieved in accordance with the present invention wherein is included the apparatus combination including a semi-rigid cantilever arm, the free end of which arm carries a force-sensitive element for placement within a gaseous stream, and wherein at least a portion of the fixed end of the arm is in parallel contact with an ultra-sensitive semi-conductor gauge element within which mechanical strains are set up—i.e., tension, compression, or both—upon flexing or bending of the arm by even very minor forces exerted by movement of the gas. The sensitive gauge element is in electrical contact with a circuit for converting differential resistance into an electrical signal of intensity bearing a distinct and definite relationship to the force exerted upon said arm by movement of the gas.

A feature of the present invention resides in the use of special semi-conductor type elements or electronic conductors wherein values of the electrical resistivity at room temperature range from about $10^{-2}$ to about $10^{-9}$ ohm-cm. Preferably, such semi-conductors are of the silicon type inasmuch as these are extremely sensitive to operation on the piazo resistance principle but are relatively insensitive to temperature and pressure changes and hence provide extremely good accuracy under wide ranges of conditions of operability. Silicon crystals, both the P and N type, are preferably doped—i.e., prepared by internal diffusion of impurities with the crystal—to render greater sensitivity. Preferably, also, the semi-conductors are used in the form of very thin plates, wafers, or flakes pressed tightly against the fixed end of the cantilever arm and, more preferably, the semi-conductors are used in pairs, one on each side of the cantilever arm. The members of the semi-conductor pairs are pressed tightly against the arm so that each is strained the same extent upon application of a deforming force.

Semi-conductors of these preferred types, especially where applied in pairs, are capable of measuring strain on the order of $2 \times 10^{-6}$ inches/inch, and lower. By the use of these semi-conductor devices in combinations hereinafter described, gas flow and changes in the rate of gas flow on the order of as little as about 0.05 ft./sec. can be conveniently and accurately measured. In fact, the device is quite reliable in the measurement of rapidly changing gas flows ranging on the order of as low as from about 0.1 to about 4.0 ft./sec., and especially reliable in measuring rapid changes in flow rate ranging as low as from about 0.1 to about 2.0 ft./sec. under a variety of conditions. Moreover, such measurements are feasible without any necessity of resorting to the use of special materials of construction.

Furthermore, in the use of these novel devices, it is found that no more than about 3 percent of the cross-sectional area of the gas-carrying conduit is taken up and often much less restricting surface is provided. In fact, it is feasible to use such devices wherein about 0.5 percent and even less of the cross-sectional area of the gas-carrying conduit is restricted.

The invention will be better understood by reference to the following detailed description of specific and preferred embodiments and to the accompanying drawings, reference being made in the description to these drawings.

Figure 2:
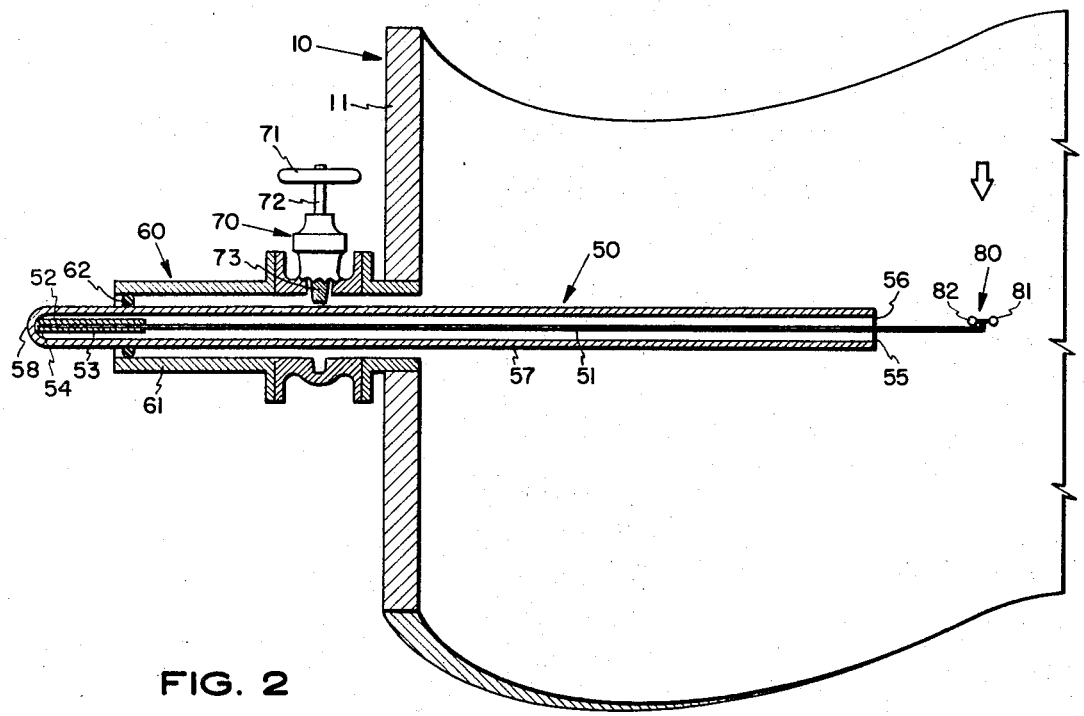

In the drawings:

FIGURE 1 represents a schematic, simplified and highly desirable form of the apparatus fitted into a gas-carrying conduit and in combination with an electrical circuit for measurement of the velocity of flow of gases through a conduit; and FIGURE 2 illustrates a more preferred embodiment of the apparatus, which apparatus form will not be damaged by sudden surges of gas at extremely high velocity as sometimes occurs due to unusual conditions within a process.

Referring to FIGURE 1 is shown a flare stack or conduit 10 through a wall 11 of which is passed strain gauge device 20 which device includes a cantilever arm 21 at the free end of which is located a target 30, the principal surface of which consists primarily of small spheres 31, 32. The spheres 31, 32 provide the major surface upon which gases can impinge and, for best results, the target 30 is generally located at the thread of a stream of moving gas or at the center of a conduit 10. The opposite end of arm 21 is "sandwiched" or located between strain gauges 22, 23 to which is connected a Wheatstone bridge 40 via lead pairs 41, 48 and 42, 49. The pair of leads 41, 48 connect strain gauge 22 across one side of the Wheatstone bridge 40 wherein is contained resistance element 45. The pair of leads 42, 49 connect strain gauge 23 across the opposite side of the bridge 40 which contains resistance element 46. The strain gauges 22, 23 in effect constitute electrical resistances in the Wheatstone bridge circuit. At static conditions, the total resistance in that half of the bridge 40 containing resistance 45 and strain gauge 22 just balance the total resistance in the other half of the bridge 40 containing resistance 46 and strain gauge 23, and there is no current flowing through galvanometer 47.

Upon passage of a gas through conduit 10 in the direction of the arrow, as shown, target 30 is deflected slightly downward placing strain gauge 23 in compression and gauge 22 in tension. Thus, the free end of arm 21 moves downwardly but the opposite end thereof is rigidly affixed to block member 13 just outside wall 11 and O-ring 12. The mechanical strains produce a change of resistance within members 22, 23 causing an unbalance of Wheatstone bridge 40. Thus, if the meter 47 initially registers a balanced condition between the circuit formed by resistances 45, 46 and strain gauges 22, 23, the resistance added to one side and subtracted from the other side of this circuit by the change of resistance within the strain gauges will cause deflection of the needle of meter 47. The unbalance will be proportional to the change of resistance within the strain gauges, or in proportion to the velocity of flow of the gas through conduit 10.

A specifically preferred embodiment is shown by reference to FIGURE 2. In this figure, a concentric member or conduit 60 is in communication with and vertically projected from wall 11 of conduit 10. With conduit 60 is fitted a gate valve 70 through which a strain gauge assembly or probe 50 can be placed or withdrawn. It will be noted that the probe 50 is positioned through O-ring 62 or other gasket device fitted at the opposite extremity of member 60. The probe 50 is provided with a cylindrical shield 57 within which is projected cantilever arm 51. It will be noted that shield member 57 is closed at one end 58 and at the closed location cantilever arm 51 is located between two strain gauges 52, 53 and rigidly connected to shield 57 at rigid connection 58. The opposite extremity of cantilever arm 51 extends outside of shield 57 and into the thread of the stream of gases flowing in the direction shown by the arrow. In the stream is located a target member 80, a major portion of which is constituted by the small spheres 81, 82. Deflection of target 80 by the gases produces a movement about the fixed connection 58 to produce mechanical strains within strain gauges 52, 53. Such deformation, which is proportional to the velocity of gas through conduit 10, can be conveniently measured by a Wheatstone bridge as described by reference to the foregoing figure.

Probe 50 is quite conveniently located and readily removed from a conduit 10 via cylindrical projection 60 and gate valve assembly 70. Thus, a cantilever arm 51 extends outside shield member 57 to the thread of the stream of gases to a distance equal to or less than the distance between gate valve or closure member 73 and the location of O-ring 62. 50 can then be withdrawn until it is just free of the gate valve 70 and then gate valve 70 can be closed by rotation of wheel 71 located on stem 72. After this, probe 50 can then be withdrawn from projection 60 and out of contact with O-ring 62.

A feature of this embodiment is that sudden surges of gas through conduit 10 can force cantilever arm 51 downwardly only to the extent of movement wherein arm 51 impinges upon exit location 55 of shield member 57. This prevents damaging of the instrument by blow-offs or surges through the conduit 10. It will also be noted that cantilever arm 51 can be located quite near exit location 56 of shield member 57 and a greater distance provided between this arm and location 55 so that greater distance of movement is provided and hence a greater velocity of flow can be measured without the necessity of increasing the inside diameter of shield member 57.

It is apparent that some modifications can be made in the apparatus described without departing the spirit and scope of the invention.

The outstanding achievement of the apparatus described is that extremely low velocities and changes in velocity of gases can be conveniently and accurately measured. Moreover, in accordance with special embodiments, the apparatus is removable from a column and can be transported from one location of use to another.

While the device or probe inserted into the column can be manufactured of materials noncorrosive to various chemicals, it has been found that this device, due in part to its removable or transportable nature, can be made of readily available and common materials of construction. Hence, because it can be readily employed and then removed from corrosive atmospheres and cleaned, it can be constructed quite cheaply.

It has been found that the cantilever beam is conveniently constructed of stainless steel of diameter ranging from about 1/64 to about 1/16 of an inch. A device having an arm 1/32 of an inch in diameter has been found highly satisfactory for general usage.

The small spheres located upon the target for creation of a drag between the gas and the cantilever arm range generally in size from only about 1/4 to about 1/2 inch in diameter. These spheres are generally used in one or more pairs, and such spheres are preferably separated one from another by a distance ranging from about 1 to 2 inches.

The shield tube should preferably range in internal diameter several times the diameter of the cantilever arm, i.e., from about 3/4 to about 7/8 of an inch. Other types of stop can be employed if desired.

The strain gauge device is capable of measuring the flow rate of gases in substantially any size conduit. A device of the dimensions described, however, is normally used in a conduit having an internal diameter ranging from about ten to twenty inches, and larger.

Having described the invention, what is claimed is:

1. In a device for measuring the flow rate of gases moving at low velocities the combination comprising a semi-rigid cantilever arm partially enclosed within a shielding concentric member, said arm having a free end with a target mounted thereon extending outside the shielding member and upon which target moving gases can impinge, said shielding member acting as a stop for the cantilevered arm to protect the device against any purges of gas, said free end occupying no more than about 0.5 to about 3.0 percent of the cross-sectional area of the conduit, and a fixed end contiguous to and mounted between a pair of semi-conductor gauges within which mechanical stresses of tension and compression, respectively, are produced upon movement of the free end of the cantilever arm by impinging gases, said gauges each possessing an electrical resistivity at room temperature ranging from about $10^{-2}$ to about $10^{-9}$ ohm-cm., and which gauges are in contact with an electrical circuit for converting the stresses produced into an electrical signal of intensity proportional to the strains to accurately measure gas velocities on an order ranging as low as about 0.1 ft./sec. to about 4.0 ft./sec., and changes in velocity as low as about 0.05 ft./sec.

2. In combination, a gas-carrying conduit with enclosing walls and a projecting cylindrical member extending perpendicularly from the conduit walls, said cylindrical member being provided at a location near the conduit wall with a gate valve and at its opposite extremity with a sealing member, a device fitted through the seal and gate valve which device includes a semi-rigid cantilever arm partially enclosed within a concentric shielding member, said arm having a free end with a target mounted thereon extending outside the shielding member and upon which target moving gases can impinge, said shielding member acting as a stop for the cantilevered arm to protect the device against any purges of gas, said free end occupying no more than about 0.5 to about 3.0 percent of the cross-sectional area of the conduit, and a fixed extremity, a portion of which is contiguous to and mounted between a pair of semi-conductor gauges within which mechanical strains of tension and compression, respectively, are produced upon movement of the free end of the cantilever arm by impinging gases, each of said gauges possessing an electrical resistivity at room temperature ranging from about $10^{-2}$ to about $10^{-9}$ ohm-cm. and which gauges are in contact with an electrical circuit for converting the stresses produced into an electrical signal of intensity proportional to the strains to accurately measure gas velocities on an order ranging as low as about 0.1 ft./sec. to about 4.0 ft./sec., and changes in velocity as low as about 0.05 ft./sec., and wherein the distance from the gate valve to the fixed extremity of the cantilever arm is at least equal to the length of that portion of the cantilever arm extending outside the shielding concentric member.

3. The device of claim 1 wherein the gas velocity ranges from about 0.1 to about 2.0 ft./sec. through the conduit.

References Cited
UNITED STATES PATENTS

| | | | |
|---|---|---|---|
| 1,903,713 | 4/1933 | Baule | 73—228 X |
| 2,826,914 | 3/1958 | Reiley | 73—228 |
| 2,866,014 | 12/1958 | Burns. | |
| 2,943,486 | 7/1960 | Osgood | 73—228 |
| 2,989,866 | 6/1961 | Widell et al. | 73—228 X |
| 3,115,777 | 12/1963 | Hochreiter | 73—228 X |
| 3,161,061 | 12/1964 | Ames. | |

FOREIGN PATENTS 830,211  3/1960  Great Britain.

JAMES J. GILL, *Acting Primary Examiner.*

RICHARD C. QUEISSER, *Examiner.*

E. D. GILHOOLY, *Assistant Examiner.*